(12) United States Patent  
Morton

(10) Patent No.: US 7,673,655 B1  
(45) Date of Patent: Mar. 9, 2010

(54) COMPOSITE WRAP REPAIR OF INTERNAL DEFECTS

(75) Inventor: Joseph Alan Morton, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 12/326,448

(22) Filed: Dec. 2, 2008

(51) Int. Cl.  
F16L 55/16 (2006.01)

(52) U.S. Cl. .......................................... 138/99; 138/98

(58) Field of Classification Search .................. 138/99, 138/97; 137/15.01  
See application file for complete search history.

(56) References Cited

U.S. PATENT DOCUMENTS

| | | | |
|---|---|---|---|
| 2,520,802 A * | 8/1950 | Hampton | 138/99 |
| 2,795,523 A * | 6/1957 | Cobb et al. | 156/94 |
| 2,924,546 A * | 2/1960 | Shaw | 156/94 |
| 4,049,480 A * | 9/1977 | Kutschke | 156/94 |
| 4,265,953 A | 5/1981 | Close | |
| 4,732,412 A * | 3/1988 | van der Linden et al. | 285/47 |
| 4,756,337 A * | 7/1988 | Settineri | 138/99 |
| 5,632,307 A | 5/1997 | Fawley et al. | |
| 5,662,974 A | 9/1997 | Andrenacci et al. | |
| 5,732,743 A | 3/1998 | Livesay | |
| 5,894,864 A | 4/1999 | Rich | |
| 6,149,969 A | 11/2000 | Gibson | |
| 6,276,401 B1 * | 8/2001 | Wilson | 138/172 |
| 6,336,983 B1 | 1/2002 | Fawley | |
| 6,355,318 B1 | 3/2002 | Tailor et al. | |
| 6,585,298 B2 | 7/2003 | Palsson | |
| 7,267,739 B2 | 9/2007 | Blackmore et al. | |
| 7,387,138 B2 | 6/2008 | Rice et al. | |
| 2002/0083993 A1 | 7/2002 | Bohon et al. | |
| 2002/0106464 A1 | 8/2002 | Bazinet | |
| 2004/0129373 A1 | 7/2004 | Nadarajah et al. | |
| 2006/0272724 A1 | 12/2006 | Borland et al. | |

* cited by examiner

Primary Examiner—Patrick F Brinson  
(74) Attorney, Agent, or Firm—Gable Gotwals

(57) ABSTRACT

A system and method for repairing and reinforcing a pipeline includes a pair of opposing composite wrap bands that are located on the external surface of the pipeline and positioned a predetermined horizontal distance from a defect area. A composite wrap is then applied over the bands to create a bridge that spans the bands and forms a cavity above the defect area. The bridge eliminates the need to clean the surface of the pipeline directly over the defect area. A second pair of bands located on the external surface of the bridge provides structural support. An actuator within the bridge monitors the pressure within the cavity and activates upon the presence of internal pressure, indicating a through-wall defect has occurred. A fitting may also be inserted into the bridge in order to pressurize the cavity and test the repair.

23 Claims, 4 Drawing Sheets

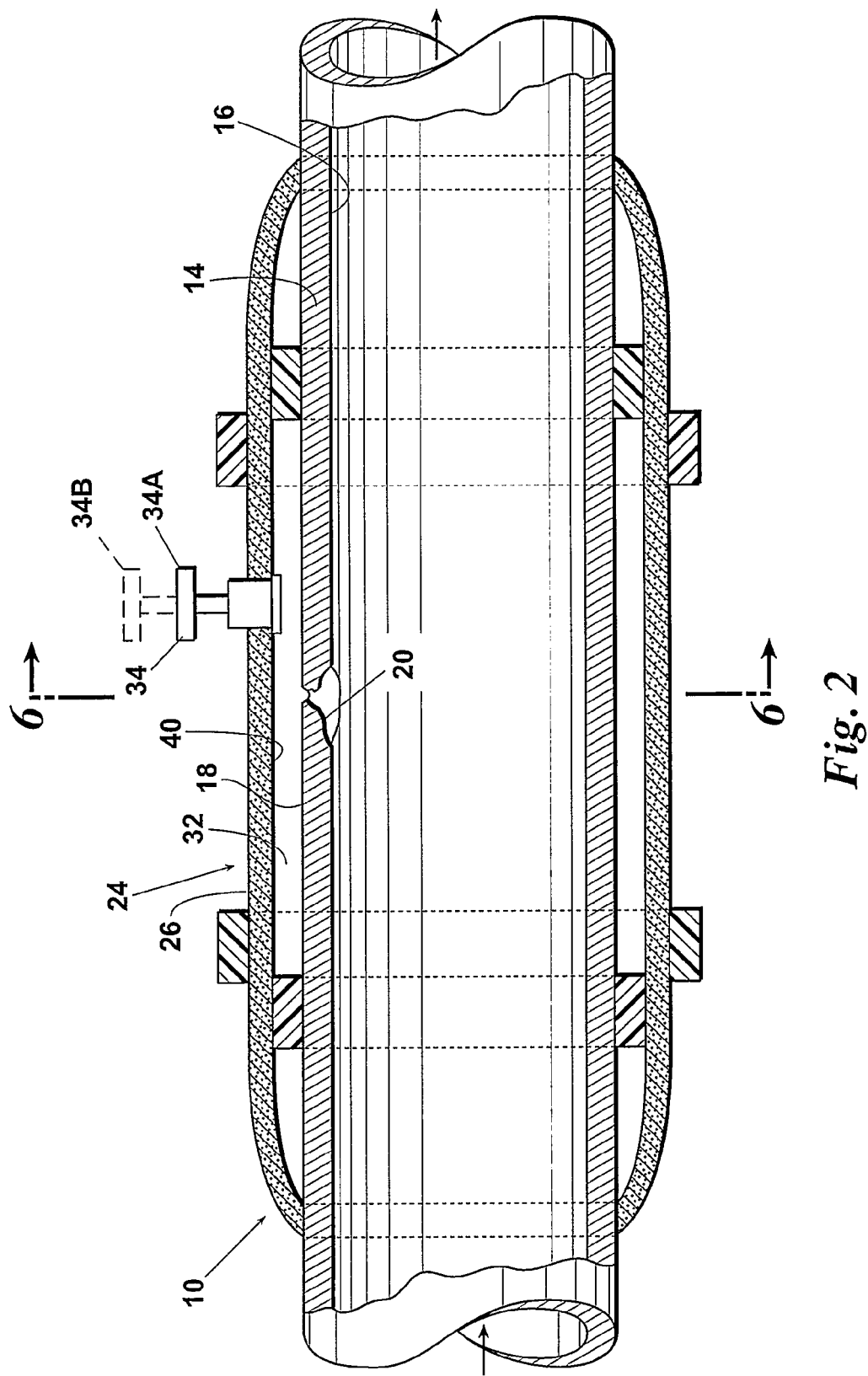

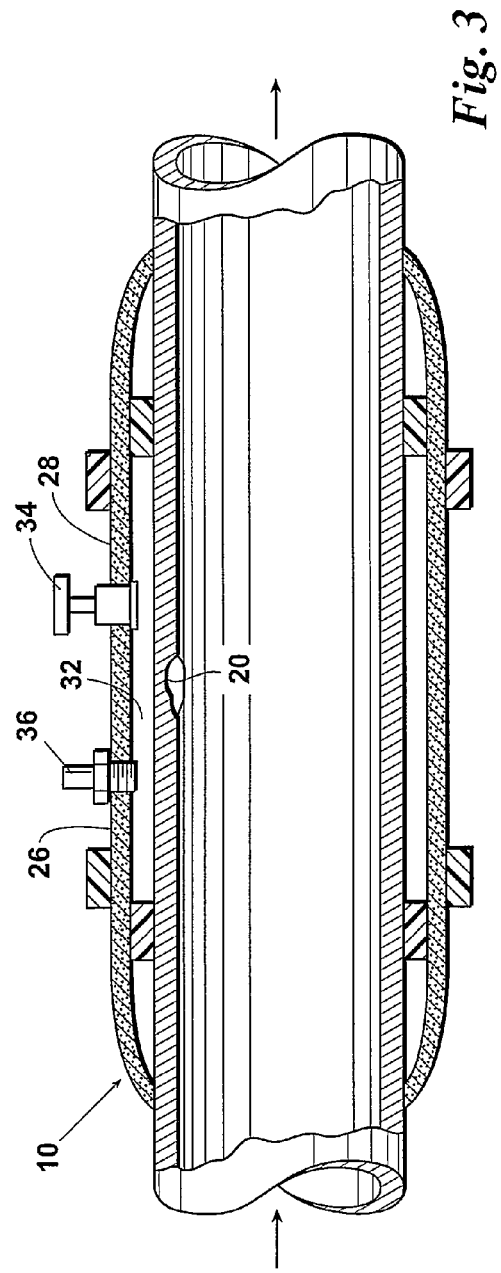
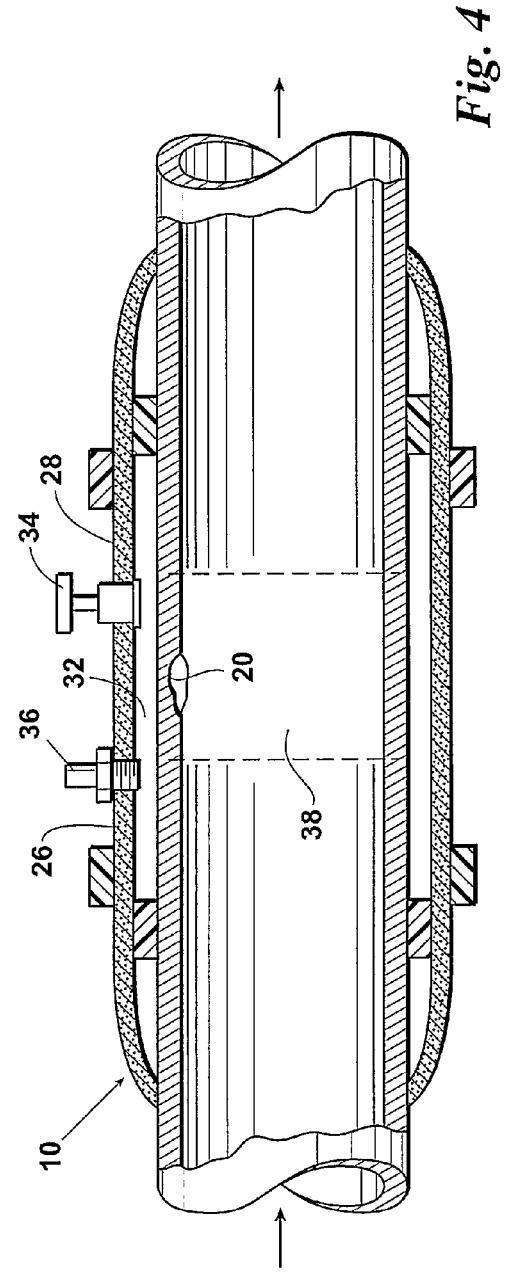

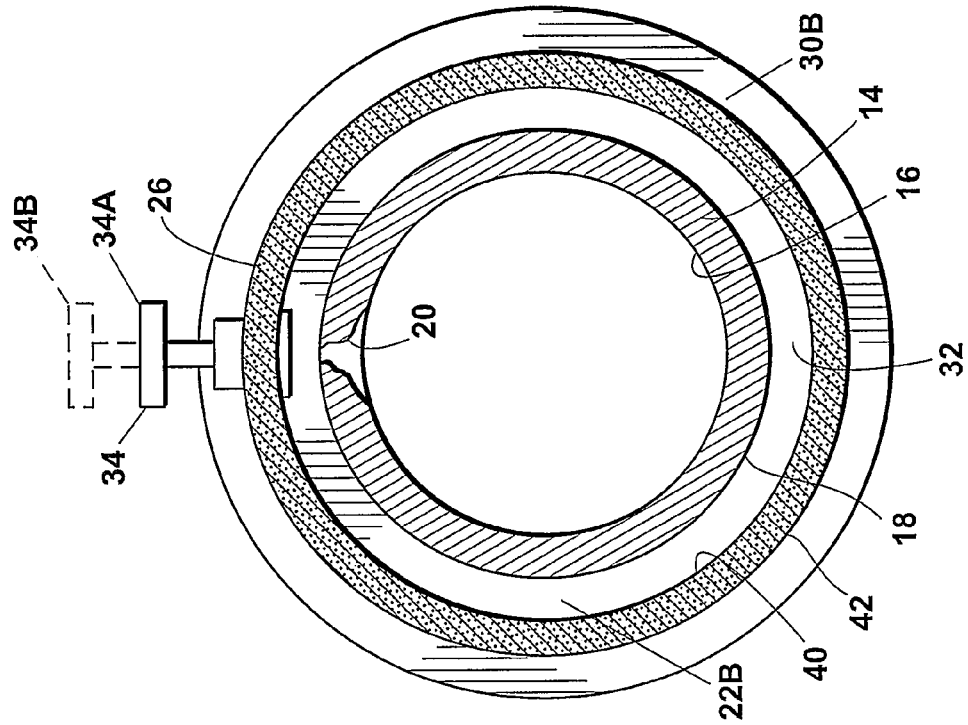
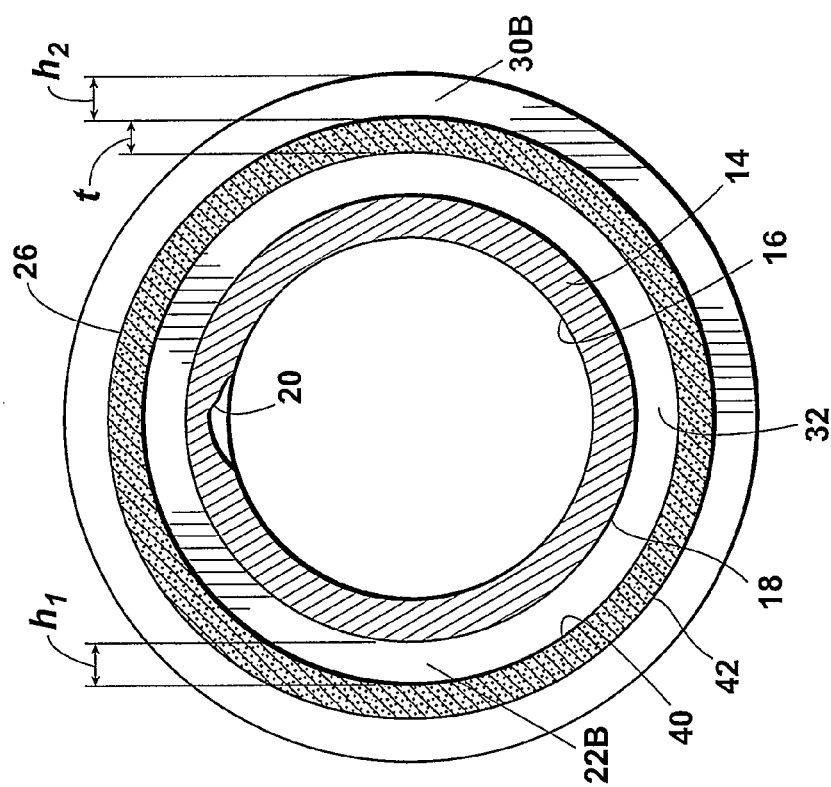
Fig. 5
Fig. 6

COMPOSITE WRAP REPAIR OF INTERNAL DEFECTS

REFERENCE TO PENDING APPLICATIONS

This application is not based upon any pending domestic or international patent applications.

FIELD OF THE INVENTION

This invention relates generally to the field of piping and pipeline repair systems. More particularly, the present invention relates to the use of composite materials in providing a piping and pipeline repair system.

BACKGROUND OF THE INVENTION

Piping systems and pipelines are subject to defects such as arc burns, corrosion, cracks, dents, fretting, gouges, and grooves that compromise structural integrity. (A person of ordinary skill in the art would recognize that a composite repair system according to this invention is equally applicable to piping as it is to pipeline. Rather than use terms such as "pipeline/piping" or "pipeline/piping system" throughout this disclosure, pipeline is used instead.) Because of the potential of a defect to cause catastrophic failure, pipeline operators employ various external and internal inspection methods to evaluate pipeline conditions and identify defects. When a defect is identified, various repair methods are employed based upon such factors as defect location, type, and size. Repair methods include grinding, weld deposit, sleeves, clamps, and hot tapping. Preferably, operators would like to make the repair without having to shutdown or reduce the flow of the pipeline.

An advance in sleeve-type repairs has been the use of composite materials. The composite is typically multiple layers of carbon, glass, or aramid fibers bound together by a polymeric matrix consisting of either epoxy, polyurethane, or vinlyester in the form of a patch or wrap. First, the surrounding pipeline surfaces are prepared to receive the composite wrap and filler by grit-blasting or an equivalent process. In a typical repair, putty filler is used to fill any voids in the pipeline created by the defect and to taper uneven welds or misaligned pipes. The surface is then prepared with low viscosity polymeric primer to ensure bonding and load transfer between the repair and the substrate. The structural reinforcing fibers, or fabric, are then saturated with a liquid polymer and the wet fibers are wrapped around the outer pipeline surface. The wrap is then allowed to cure at ambient temperature and atmospheric pressure.

Composite wrap repairs can be difficult and labor intensive due in part to the handling of the wet fibers and the time-sensitive nature of the liquid polymer. As the polymer set-up time or pot life expires, the liquid polymer becomes more viscous and difficult to mold and shape. Unlike cure time, which may be a day or several days, the pot life of many liquid polymers is only a few minutes.

Other types of composite wrap systems include a pre-impregnated system and pre-cured coil. A pre-impregnated system is one that has a polymer applied onto the fibers at the factory; however, the polymer is not fully cured at this stage. Reaction of the polymer is achieved by the addition of heat or a chemical (including water) to the pre-impregnated fiber. This means that a liquid polymer is applied to dry fibers at a factory and the reaction is suspended until heat or some type of chemical is added to the system once it is applied to the pipeline.

In a pre-cured coil, the repair system is shipped from the factory with the polymer completely reacted onto the fibers. Each layer of the repair system is therefore pre-cured and is pre-formed to the pipeline outer diameter. In the field, this pre-cured coil is pulled around the pipeline and an adhesive is applied to each layer to bond the coil together.

The condition of current composite systems does not provide for safe working conditions or testing. For safety reasons, pipeline operators do not like to work on a pipe directly over a defect under pressure. Yet, in all wet-apply systems, the external surface of the pipeline directly above the defect must be cleaned in order for the composite to bond at the defect. If the external pipe was grit-blasted or mechanically cleaned too severely, the cleaning could thin the wall to a point of failure. And once put into place, the composite repair cannot be pressure tested for structural soundness prior to being put into service.

Last, current composite systems apply the entire repair structure directly to the pipe. Absent the use of external clamping devices, the cured composite cannot be pressurized up to a percentage of the internal pipeline pressure before the internal defect develops into a through-wall defect.

BRIEF SUMMARY OF THE INVENTION

A system and method for repairing and reinforcing a pipeline includes a pipeline section having an internal wall defect that is bounded by a first pair of composite wrap bands. Each band in the first pair of composite wrap bands is located on the external surface of the pipeline section and positioned a horizontal distance "$d_1$" from the internal wall defect. A composite wrap bridge spans between the bands and creates a cavity above the internal wall defect. The bands are preferably built up to a height "h" and a width "w" to act as effective supports for the bridge. Because the portion of the bridge that spans between the bands does not come into contact with the external surface of the pipeline, that portion of the pipeline lying directly above or near the defect does not need to be cleaned.

A second pair of bands provides structural support to the bridge. Each band in the second pair of bands may be a composite wrap band or a non-composite band such as a metal band. The bands, which are located on the external surface of the bridge, are offset a horizontal distance "$d_2$" from the internal wall defect. Each band in the second pair of bands preferably has a predetermined height "h" and width "w" effective for providing structural support to the bridge.

Within the bridge is an actuator for monitoring pressure within the cavity. The actuator activates upon the presence of internal pressure and indicates whether a through-wall defect has occurred. The bridge has sufficient thickness "t" to contain the pressure within the cavity.

A fitting may be located within the bridge for pressurizing the cavity. The cavity may be pressurized to test the repair or may be pressurized to a percentage of the interior pipeline pressure in order to prevent the internal wall defect from becoming a through-wall defect.

A better understanding of the invention will be obtained from the following detailed description of the preferred embodiments taken in conjunction with the drawings and the attached claims.

BRIEF DESCRIPTION OF THE DRAWINGS

FIG. 2 is a view of the pipeline section containing the defect and being encompassed by the repair structure. A cavity defined by the built-up bands, the bridge and the external surface of the pipeline contain pressurized flow escaping through a through-wall defect. An actuator inserted within the bridge actuates on the presence of internal pressure to indicate that a through-wall defect has occurred.

FIG. 3 is a view of the repair structure including a fitting in the bridge. The fitting may be used to inject pressurized fluid or gas into the cavity to test the integrity of the repair or to prevent the wall defect from becoming a through-wall defect.

FIG. 4 is a view of a bent pipeline section containing a product flow and having the composite repair structure applied to a defect in the bend area of the pipeline wall.

FIG. 5 is a view taken along section line 5-5 of FIG. 1.

FIG. 6 is a view taken along section line 6-6 of FIG. 2.

DETAILED DESCRIPTION OF THE PREFERRED EMBODIMENTS

Figure 1:
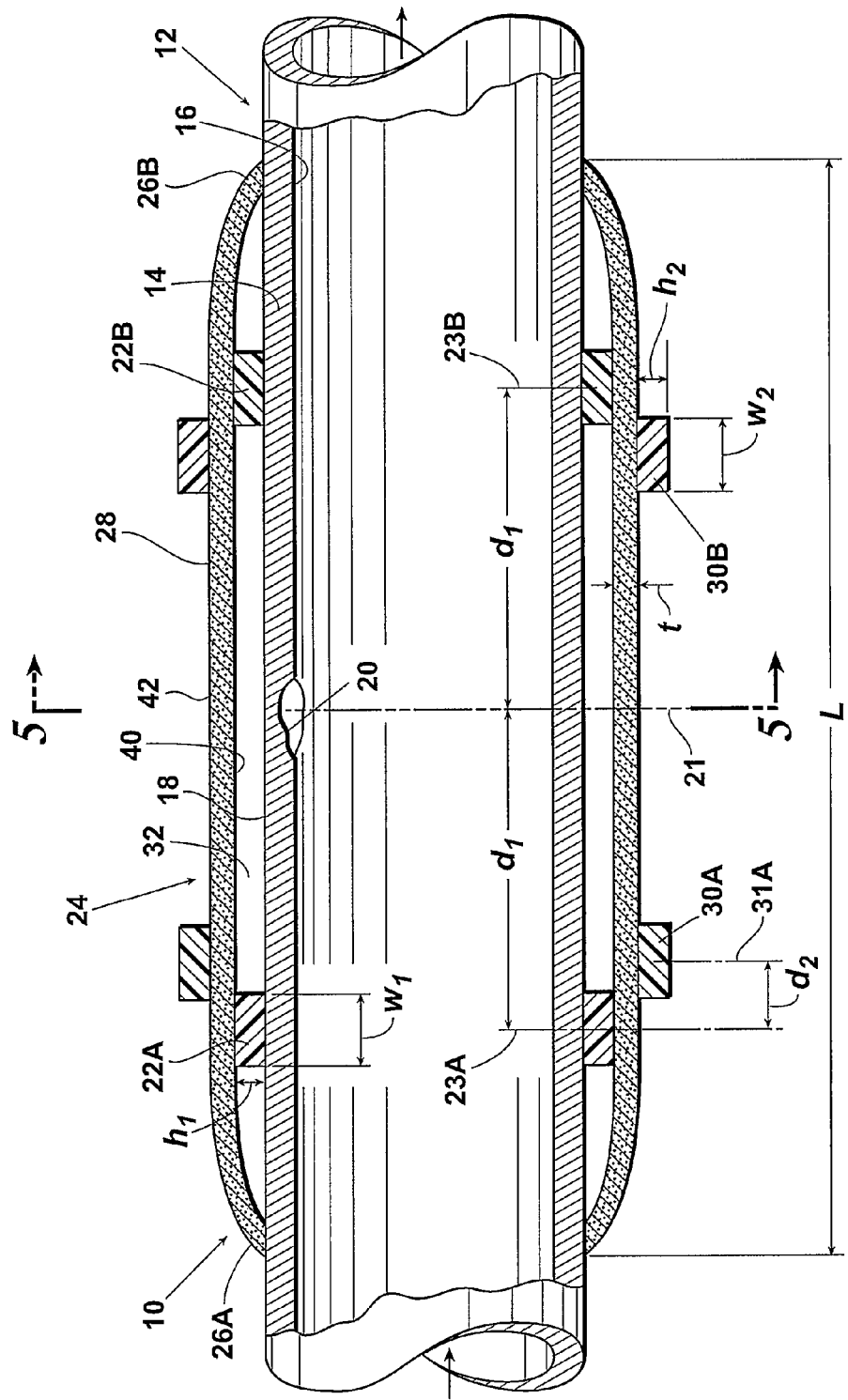
FIG. 1 is a cross-sectional view of a pipeline section containing a product flow and having a defect in a portion of the pipeline wall. A built-up band of composite material acts as a support for a composite wrap that bridges the defect area. Additional bands are added over the bridge as structural support.

A composite repair will now be described in reference to the drawings in which the elements are numbered as follows:

| 10 | Composite wrap repair | 26 | End span |
| 12 | Pipeline or piping section | 28 | Middle span |
| 14 | Pipeline wall | 30 | Bands |
| 16 | Internal surface | 31 | Centerline |
| 18 | External surface | 32 | Cavity |
| 20 | Defect | 34 | Actuator |
| 21 | Centerline | 36 | Fitting |
| 22 | Bands | 38 | Bend |
| 23 | Centerline | 40 | Internal surface |
| 24 | Bridge | 42 | External surface |

Referring now to FIG. 1, a pipeline section 12 contains a pressurized product flow that exerts an outward radial pressure on an internal surface 16 of pipeline section 12. Arc burns, corrosion, cracks, dents, fretting, gouges, or grooves create an internal defect 20 in the wall 14 of pipeline section 12. Defect 20, which is preferably not a through-wall defect, compromises the integrity of pipeline section 12 and represents a potential failure point. A person of ordinary skill would recognize that defect 20 may also represent one or more defect 20 that collectively represent a defect area.

A composite repair system 10 provides a repair to the pipeline section 12 containing the defect 20. Composite repair system 10 includes a first and second set of bands 22, 30 that provide structural support for a composite wrap bridge 24. Bands 22, 30 are preferably composite wrap bands. A composite wrap sold by TDW, Tulsa, Okla., under the trademark RES-Q™ provides a suitable fiber and epoxy system for the bands 22, 30 and bridge 24. Bands 30 may also be a non-composite material such as a metal band. Additionally, because the strength of the composite might be derived from the bands 30, a non-composite or metal band 30 may be applied in addition to a composite band 30. A similar structure may be applied to bands 22.

Bands 22A, 22B are wrapped about the external surface 18 of pipeline section 10 and offset in a vertical plane relative to defect 20. Preferably, each band 22A, 22B is positioned at a predetermined distance "$d_1$"—as measured from band centerline 23A, 23B, respectively, to an approximate defect centerline 21. Although the portion of external surface 18 directly below the bands 22A, 22B must be cleaned in preparation for the bands 22, the portion of the external surface 18 directly above defect 20 does not need to be cleaned.

Once bands 22A, 22B are in place, additional composite wrap is wrapped about pipeline section 12 using bands 22 as a support structure to create a bridge 24 having an overall predetermined span of length "L" and thickness "t". Bridge 24 includes two end spans 26 and a middle span 28. End spans 26A, 26B lie to the left and right of bands 22A and 22B, respectively, with a middle span 28 in between.

A cavity 32 is formed between bands 22A and 22B, the internal surface 40 of middle span 28, and the external surface 18 of pipeline section 12. Thickness "t" is preferably selected so that cavity 32 may contain pressure. Because middle span 28 never comes into contact with external surface 18, the portion of external surface 18 located opposite middle span 28 does not require preparation and cleaning. The bands 22A, 22B are built-up to a predetermined height "$h_1$" and width "$w_1$" to provide adequate support and clearance for middle span 28. See FIG. 5.

A second set of bands 30A, 30B are wrapped about the external surface 42 of bridge 24 and offset in a vertical plane relative to defect 20. Bands 30A and 30B are preferably located between bands 22A and 22B and are preferably offset a predetermined horizontal distance "$d_2$"—as measured from a band centerline 31 of band 30A, 30B, respectively to band centerline 23 of band 22A, 22B, respectively. Each band 30A, 30B is built-up to a predetermined height "$h_2$" and width "$w_2$" to provide adequate structural support to bridge 20. See FIG. 5. A person of ordinary skill in the art would recognize that the number of bands 22, 30 and their placement relative to one another and to one or more defects 20 depend on such factors as the location, length, geometry and type of pipeline section 12 and the location, nature and size of the defect 20.

Referring now to FIGS. 2 and 6, middle span 28 of bridge 24 may include an actuator 34 that cures as part of the composite wrap. Actuator 34 activates upon the presence of internal pressure within cavity 32, moving from a first position 34A to a second position 34B, thereby indicating that defect 20 has developed into a through-wall defect. Cavity 32 contains the product flow entering from the through-wall defect 20.

Referring now to FIGS. 3 and 4, middle span 28 of bridge 24 may also include a fitting 36 for use in injecting a pressurized fluid (gas or liquid) into cavity 32 and for use in relieving pressure within cavity 32. Pressurizing the cavity 32 allows for testing the structural soundness of composite repair system 10 before placing it into service or bringing the pipeline section 12 to full operating pressure. Pressurizing the cavity 32 up to a percentage of internal pipeline pressure may also prevent defect 20 from developing into a through-wall defect. As illustrated in FIG. 4, composite repair system 10 may also be applied to a curvilinear or bend area 38 of a pipeline section 12 and include actuator 34 and fitting 36.

While a composite repair system has been described with a certain degree of particularity, many changes may be made in the details of construction and the arrangement of components without departing from the spirit and scope of this disclosure. The composite repair system, therefore, is not limited to the embodiments set forth herein for purposes of exemplification, but is to be limited only by the scope of the attached claims, including the full range of equivalency to which each element thereof is entitled.

What is claimed is:

1. For use in monitoring, repairing or reinforcing a pipeline, a system comprising:

a first pair of composite wrap bands;

a second pair of bands; and a composite wrap bridge;

each band in said first pair of composite wrap bands being located on an external surface of a portion of a pipeline section;

said composite wrap bridge spanning at least said first pair of composite wrap bands to form a cavity defined by an internal surface of said bridge and an external surface of said external surface of said portion of said pipeline section lying between said first pair of composite bands;

each band in said second pair of bands being located on an exterior surface of a portion of said bridge.

2. A system according to claim 1 further comprising a portion of at least one band in said second pair of bands being a composite wrap band.

3. A system according to claim 1 further comprising an actuator located within said bridge and in communication with said cavity.

4. A system according to claim 1 further comprising a fitting located within said bridge and in communication with said cavity.

5. A system according to claim 4 further comprising said cavity being pressurized to a percentage of an interior pipeline pressure.

6. A system according to claim 1 further comprising said cavity being effective for containing a pressurized pipeline product entering into said cavity.

7. A system according to claim 1 further comprising a portion of said bridge having a predetermined thickness "t" effective for containing a pressurized fluid located within said cavity.

8. A system according to claim 1 further comprising each band in said first pair of composite wrap bands having a predetermined height "$h_1$" and width "$w_1$" effective for supporting said bridge.

9. A system according to claim 1 further comprising each band in said second pair of bands having a predetermined height "$h_2$" and width "$w_1$" effective for providing structural support to said bridge.

10. A system according to claim 1 further comprising at least one band in said first pair of composite wrap bands being located a predetermined horizontal distance "$d_1$" from at least one of a defect area and a potential defect area of the pipeline section.

11. A system according to claim 1 further comprising said pipeline section being selected from the group consisting of a straight pipeline section and a curvilinear pipeline section.

12. A system according to claim 1, the composite wrap comprising a fiber material and a polymer matrix, said fiber material being selected from the group consisting of carbon, glass, aramid, and a mixture thereof, said polymer matrix being selected from the group consisting of epoxy, polyurethane, vinylester, polyurea, and cyanate ester.

13. A system according to claim 1, the composite wrap being selected from the group consisting of a pre-impregnated composite wrap and a pre-cured coil wrap.

14. A method of reinforcing a pipeline section using a composite wrap, the method comprising the steps of:

building-up a first pair of opposing bands on an external surface of the pipeline section, applying a composite wrap that spans the first pair of opposing bands and forms a bridge over an area of the pipeline section located between the first pair of opposing bands;

building-up a second pair of opposing bands on an external surface of the bridge; and allowing the bridge to cure.

15. A method according to claim 14 further comprising monitoring a pressure within a cavity defined by said first pair of bands and an internal surface of the bridge and an external surface of the pipeline section lying between the first pair of bands.

16. A method according to claim 14 further comprising the step of monitoring including an actuator located within the bridge.

17. A method according to claim 14 further comprising the step of pressure testing a completed repair.

18. A method according to claim 17 further comprising the step of pressure testing including a fitting located within the bridge.

19. A method according to claim 17 further comprising the step of pressure testing including a pressure that is a predetermined percentage of an internal pipeline pressure.

20. A method according to claim 14, the composite wrap comprising a fiber material and a polymer matrix, said fiber material being selected from the group consisting of carbon, glass, aramid, and a mixture thereof, said polymer matrix being selected from the group consisting of epoxy, polyurethane, vinylester, polyurea, and cyanate ester.

21. A method according to claim 14, the composite wrap being selected from the group consisting of a pre-impregnated composite wrap and a pre-cured coil wrap.

22. A method according to claim 14, the second pair of opposing bands being offset horizontally from the first pair of opposing bands.

23. A system according to claim 1 further comprising at least one of said each band in said second pair of bands being offset a predetermined horizontal distance "$d_2$" from at least one of said each band in said first pair of composite wrap bands.

* * * * *